United States Patent Office 3,444,109
Patented May 13, 1969

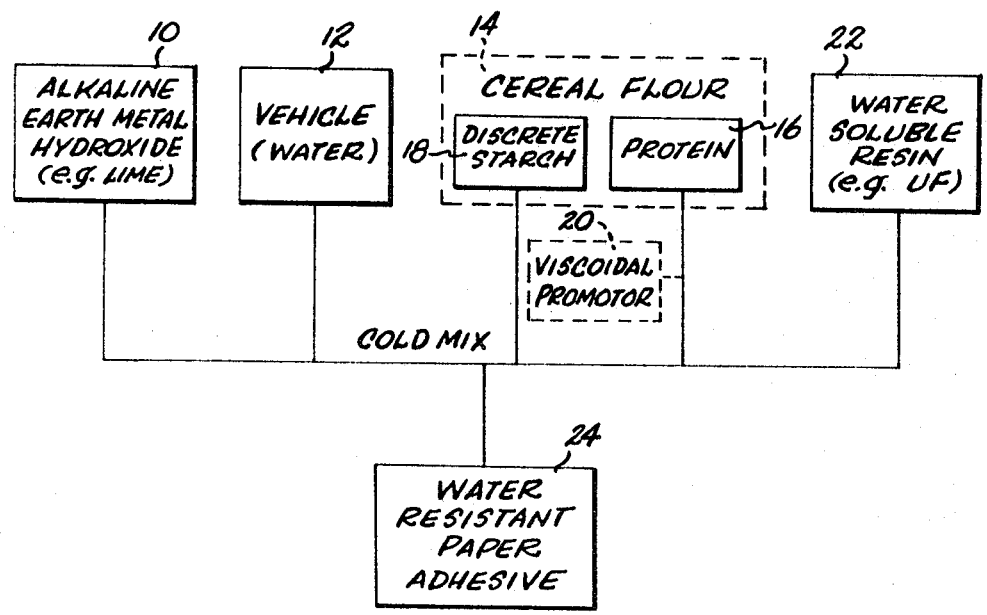

3,444,109
PAPER LAMINATING ADHESIVE COMPOSITIONS COMPRISING PROTEIN-CONTAINING STARCH MATERIAL
Alexander J. Golick, Seattle, and John T. Stephan, Longview, Wash., assignors to Westix Corporation, Longview, Wash., a corporation of Washington
Continuation-in-part of application Ser. No. 844,722, Oct. 6, 1959. This application Feb. 11, 1966, Ser. No. 526,738
The portion of the term of the patent subsequent to Aug. 15, 1984, has been disclaimed
Int. Cl. C08g 37/38, 37/32; C09j 3/18
U.S. Cl. 260—6                                                      19 Claims

ABSTRACT OF THE DISCLOSURE

Paper laminating adhesive compositions, certain of which are especially adapted for the bonding of corrugated board stock under commercial production conditions, with high-speed bonding and highly satisfactory laminated product water resistance, such adhesive compositions being characterized by a first reactant in the form of a finely divided, potentially adhesive, potentially viscoidal primary material having a protein content of at least about three precent by weight and an ungelatinized starch content of from about fifty percent to about eighty-five percent by weight, a second reactant which serves as a starch gelatinization agent and is a slightly water-soluble alkaline earth metal hydroxide forming material such as lime, providing by chemical reaction with the protein of substantial water resistance in the resulting adhesive bond, and a third reactant in the form of a water soluble resin selected from the group consisting of amino-aldehyde liquid resins, ketone-aldehyde liquid resins, and mixtures thereof, such as urea-formaldehyde resin. Additive ingredients can also be employed, such as viscosity modifying agents, inorganic and organic filler materials, emulsive water propellants, wetting agents, and preservatives.

---

This application is a continuation-in-part of my copending and now abandoned application Ser. No. 844,722, entitled, "Paper Laminating Adhesives, Materials and Processes Concerning Same, and Products Formed Thereby," and filed Oct. 6, 1959.

This invention relates to cold mixed, fast settable adhesives for bonding thin porous and/or fibrous materials, laminating paper products, or laminating paper to wood, metal, porous, or fibrous materials, especially where enhanced water resistance is desired. More particularly the present invention relates to adhesives as employed on high-speed bonding machines for the production of paper products, such as corrugated paper board, laminated fiberboard, paper covered veneer, and the like, the resultant bond being highly satisfactory from the point of view of laminated product water resistance and production speeds, the adhesive system characteristic of the invention nonetheless being inexpensive, easy to prepare and easy to handle in use.

Historically, early paper corrugating adhesives commercially involved a sodium silicate or like inorganic aqueous solution, with the adhesive setting by accelerated evaporation loss of the solvent vehicle through application of heat. A first major change in this commercial practice came in about 1935, involving an adhesive and process such as that disclosed in Bauer U.S. Patent No. 2,102,937 for example, wherein is disclosed a discrete starch dispersed in a premixed alkaline carrier containing gelatinized starch. To prepare the Bauer adhesive, an isolated starch such as cornstarch or tapioca starch is suspended in about five times its weight of water, then about 10% caustic soda (based on the dry weight of the starch) is added, and the mixture is heated to about 150° F. or higher up to 195° F. to cause gelatinization of the starch, resulting in a viscous aqueous alkaline starch dispersion which is then used as the carrier or vehicle for the discrete or ungelatinized starch. The vehicle thus prepared is cooled to about 100° F., then the discrete starch is added in sufficient amount to give an adequately fast set with heat in the bonding machine, such as a paper corrugating machine. The Bauer composition inherently requires two separate mixing stages with application of heat in first or premix state of preparation of the adhesive, and with the adhesive solution containing sufficient caustic to give a pH of about 10.5 to about 12.0. The resulting adhesive bond, using the Bauer formulation, also has disadvantageous characteristics in terms of narrow gelatinization temperature range, and of not being adaptable to formulation as a dry mix because of the necessity for a liquid dispersion vehicle and because of an inherent tendency in a caustic containing dry mix for "spot" gelatinization to occur. Also importantly, the Bauer adhesive is usually gel-like at temperatures below about 105° F. and therefore requires constant temperature control, and during storage must be thermostatically controlled to provide suitable flow properties. At these elevated temperatures the tendency toward premature gelatinization in production equipment is aggravated. In the present cold-mix system, the liquid adhesive temperature is considerably below that of the Bauer system and therefore provides a greater margin of safety under commercial use conditions. Also, and of extreme importance in many applications, is the fact that the Bauer adhesive has no water resistance either when hot-set or dried by evaporation, a glued product bonded with the Bauer adhesive being subject to complete delamination in about 5 minutes when immersed in water. Further, the Bauer formulation is not compatible to economical addition of water-resistance imparting ingredients such as urea formaldehyde resin.

Operationally important advantages characteristic of the adhesive system are also found in the manner of use thereof. Keeping in mind that it is customary to maintain a conventional adhesive at an elevated temperature during use in order that its flow properties be suitable for handling on production equipment, it is important to note that the adhesive system of the present invention is deliverable and handleable on production equipment while at room temperature, i.e., in the so-called "cold" condition. Cold handling of the adhesive creates an operating condition where the temperature differential between the equipment and the adhesive is generally greater, with a corresponding reduction in the tendency of the adhesive to prematurely gelatinize. Further, the inherently greater stability and lower handling temperature of our adhesive while being handled makes possible a reduction in the average gelatinization temperature at which the equipment is operated without danger of premature adhesive gelatinization. As direct consequences of a lower average gelatinization temperature, the heating cost requirement for the equipment is reduced, its production speed potential is increased, and any tendency of the product to shrink or warp due to excessive drying in the final stages of the forming equipment is also reduced. Also, a characteristic of our adhesive system which is of fundamental importance to the art is the fact that the water resistant complex is formable even at room temperature, in direct contrast to certain previous water resistant modifications of the Bauer adhesive system, where elevated temperatures maintained for substantial times are necessary to develop water resistant properties. As a consequence of the capability of our adhesive system to form the water resistant complex at a lower temperature, production runs can be made at lower average gelatinization temperatures without loss or adverse compromise of water resistant properties, the operating balance between average gelatinization temperature and production speed when using the adhesive system of the present invention being determined essentially only by the temperature and setting time necessary to get a dry bond.

Bauer U.S. Patent No. 2,102,937 is also of interest to an understanding of some of the considerations involved with respect to the present invention, because of its description of a typical form of commercially used apparatus for forming corrugated paper board. Briefly, such equipment includes three supply rolls of paper, the paper from one supply roll passing through two meshing corrugating rolls, the fluted paper becoming subsequently the core or center ply of the formed corrugated paper board. In such apparatus, the fluted core after its formation on the heated corrugating rolls then passes an adhesive applicator roll engaging the peaks or "nips" of the fluted paper along one side thereof, after which the paper liner from a second supply roll is applied to the adhesive coated flutes or nips. In such a machine, the core and liner pass around a heated drum, the temperature of the drum being commonly about 375° F., with the time on the drum at satisfactory commercial production speeds being only about 1/30 of a second.

Since the corrugating rolls are heated, a partial setting of the adhesive occurs between the core and the liner almost instantaneously, i.e., while said core and said liner are on the heated roll. The core and liner thus bonded are next passed over the return pass roller, a second adhesive covered roll applying adhesive to the nips on the other side of the core, after which a second liner is fed onto the adhesive coated nips from the third supply roll of the machine, thus completing both sides or liners of the formed paper board. After being thus fabricated, the formed paper board passes undet belt pressure over a steam heated hot plate stage of suitable length to insure set of the adhesive bond between the core and the second liner. In existing commercial equipment, the hot plate or like heater is maintained at about 375° F. and is of sufficient length to maintain the heat on the formed corrugated paper board, and particularly the second liner thereof, for about five seconds, it being necessary to provide more heating time for developing adequate adhesion in the second liner bond, as compared with the first liner bond, because of the enclosed nature of the formed board and since the curing heat is applied from one side only.

During World War II, the necessity for water resistant laminated paper products became pronounced, and the quest for satisfactory water resistant board resulted in addition of various resin forming materials to the Bauer formulation. The first proposed solution involved the adoption of acid pH conditions in the adhesive solution, rather than alkaline conditions, in order to permit adequate polymerization of the urea-formaldehyde resin employed to impart water resistance to the formed adhesive bond. Such an adhesive system, involving the use of urea-formaldehyde resin, is disclosed in Ceaser et al. U.S. Patent No. 2,463,148 for example. Such system involves a pH of about 5.0–6.5, and proved comparatively quite slow in terms of commercial production speeds (with about 225 feet per minute a practical maximum), primarily because of the high temperature requirement for gelatinization of the discrete starch ingredient under the acidic conditions necessary for polymerization of the resin. In an attempt to increase the production rate of water resistant corrugated board, the pH of the adhesive was then raised upward onto the alkaline side in order to lower the gelatinization temperature of the suspended raw starch but this impaired water resistant properties because a change of the pH to the alkaline side slowed down the polymerization of the acid-curing urea-formaldehyde resin with resulting lower degree of water resistance in the finished board. Whereas such alkaline urea-formaldehyde starch combinations permit normal high production speeds for the development of an adequate dry bond, additional heat is required to develop the necessary degree of water resistance. This inconsistency was compromised by using slower machine throughput speeds as compared with the non-water resistant alkaline systems to gain the necessary higher bonding temperatures. Further attempts to resolve the problem of developing adequate water resistance in high speed paper laminating adhesives have involved incorporating in the common alkaline Bauer type adhesive an alkaline curing ketone-formaldehyde type resin to promote faster polymerization in the faster setting more alkaline starch adhesive system, such as is disclosed in Scrutchfield U.S. Patent No. 2,529,851. Similarly a resorcinol-formaldehyde type resin alkaline starch system is disclosed in Kesler U.S. Patent No. 2,626,934 and Kesler et al. U.S. Patent No. 2,650,205. Characteristically, these types of adhesive systems involve a low solids content, the presence of sodium hydroxide or similar alkali metal hydroxide (with resulting pH of about 9–12), a heat gelatinized starch or dextrin carrier, a discrete starch, and comparatively expensive resin materials. In these adhesive systems, presence of substantial amounts of alkali metal caustic is necessary to give a sufficiently low viscosity and high pH to the carrier portion of the system for flowability and to lower the gelatinization temperature of the discrete starch ingredient to the point where the discrete starch can gelatinize sufficiently fast in the bonding process to permit satisfactory production speeds. It is generally recognized, however, that the presence of a substantial amount of one or more highly water soluble alkali metal salts is deleterious to the water resistance properties of the dried adhesive bond, since the dried highly water soluble alkali metal salts present in the dry adhesive film redissolve rapidly when exposed to water, thereby weakening the bond.

In contrast to earlier attempts to suitably compromise the various apparently incompatible conditions and considerations as to starch containing paper laminating adhesive systems to obtain adequate water resistance consistent with high production speeds and low material cost, the present invention avoids and in many respects effectively obviates the necessity for such compromises.

The present invention involves a paper laminating alkaline aqueous adhesive system where the primary, potentially adhesive ingredient is a viscoidal, proteinaceous, ungelatinized starch containing material in particulate form, such as a cereal flour or the like, compounded with a liquid, water dispersible or water soluble resin constituent, such as an amino-aldehyde liquid resin, a ketone-aldehyde liquid resin, and mixtures thereof capable of forming in the formulation environ of the system a non-reversible, colloid type, reaction product in the dried adhesive bond. The formulation further includes, as essentially the only inorganic reactant, an alkaline earth metal hydroxide reactant with sufficient water solubility to autogenically give a pH in water solution of at least about pH 9, such reactant advantageously being calcium hydroxide. Such reactant acts to accomplish the following functions; (1) to effectively disperse the protein constituent, (2) to impart to the adhesive solution a pH in the range of about 9.0 to about 12.5 to maintain a favorable gelatinization condition for the discrete starch constituent of the cereal flour, and (3) to enter into reaction with the protein and starch constituents of the flour as well as resin constituent of the formulation when present and produce the aforesaid nonreversible, colloid type, water resistant reaction product in the dried adhesive bond.

In general terms and as shown diagrammatically in the block diagram presented in the accompanying figure, the water resistant adhesive system of the present invention involves cold mixing of a slightly water soluble polyvalent alkaline reactant 10, such as lime, with an aqueous vehicle such as water 12 and a proteinaceous, ungelatinized starch containing material in particulate form such as cereal flour 14 having a protein constituent 16 and a discrete starch constituent 18. Such cereal flour may be of a type giving a viscoidal dispersion in an aqueous mix or, as appropriate, the protein constituent 16 of the cereal flour can be rendered viscoidal by addition of a viscoidal promotor 20 such as sodium bisulfite solution while mixing the ingredients. In a manner more fully discussed in connection with subsequent examples, the formulation further includes a liquid, water soluble resin, such as urea formaldehyde resin 22, for example. On cold mixing with the other ingredients the resin constituent produces a paper adhesive 24 which is characterized by a cold-setting capability and by a high degree of water resistance. More detailed and further variations as well as other compatible additives and ingredients which can be incorporated into the lime-protein-starch-resin adhesive system will be apparent from the following more detailed discussion thereof and from the subsequent examples.

In contrast to the customary utilization of isolated starch of one form or another as the potentially adhesive material in the paper laminating adhesive system, the adhesive system of the present invention utilizes a different form of potentially adhesive material, notably a cereal flour or equivalent compounded mixture of protein and natural or refined starch constituents, and functionally turns to advantage both the starch constituent and the protein constituent of the system.

By the term "viscoidal, proteinaceous, ungelatinized starch containing material in particulate form," the present invention contemplates that such potentially adhesive material be any more or less finely ground cereal flour or like starch and protein containing flour with or without the bran and/or germ. Suitable cereal and like flours, which are also termable cereal type flours, include wheat flour, rye flour, oat flour, barley flour, millet flour, corn flour, oat flour, sorghum flour, milo flour, pea flour, potato flour and the like, containing protein in substantial proportion, say at least about 3% on a dry weight basis, also containing discrete starch in the amount of from about 50% to about 85% on a dry weight basis, and further containing various soluble gummy substances in incidental amounts. Further included in such generic term denoting the potentially adhesive primary material in the formulation of the adhesive of the invention are mixtures of various flours, it being often possible and commercially practical to fortify the protein content of a low-protein cereal flour by adding thereto a noncereal or leguminous flour or the like, also termable leguminous type flours, such as soybean flour, peanut meal flour, cottonseed meal flour, safflower meal flour, mixtures thereof, and the like. An isolated protein such as the proprietary product Alpha-Protein is an equally suitable protein fortifier. Also, certain animal proteinaceous materials such as blood albumen, animal glue, casein in its soluble and insoluble forms, fermentation residues from the beer and antibiotic industries, pulp residue from beet sugar manufacture, and mixtures of any such similar natural materials can be used to fortify the protein content of a cereal flour, as described. As is known in the cereal flour arts, cereal flours vary considerably in their capacity to give viscous type flow (i.e., being viscoidal) when dispersed in water, as distinguished from glutinous or plastic type flow. For example, rye flour and about half of the available wheat flours are capable of giving substantially viscous flow in our formulations without any pretreatment. However, some wheat flours and certain various other protein and starch containing materials which naturally have more or less of a tendency toward plastic flow can be rendered viscoidal by pretreatment with a water soluble sulfide, sulfite or bisulfiite salt, such as sodium sulfite, in a manner known per se, as in Clark U.S. Patent No. 2,580,890, for example. Such pretreated flours and the like are to be considered within the scope of the above quoted terminology, the modification of the material to develop viscous type flow on dispersing of the material in water solution being identifiable with the "viscoidal" characteristic such terminology presents. Further, it is to be recognized that various arificial formulations of a protein-containing and a starch-containing material or materials is possible within the scope of the quoted terminology and is within the skill of those in the art.

Viscosity modifying materials may be included such as British gums, dextrins, soluble starches, pregelatinized starches, oxidized starches, borated dextrins, enzyme modified starches, water soluble natural gums, water soluble cellulose compounds, water soluble synthetic polymers, and the like. Various fine ground inorganic filler materials such as china clay, bentonite, gypsum, silica, diatomaceous earth, whiting, and the like can be incorporated and in some circumstances provide additional stiffness in the finished board as well as aiding in the control of the viscosity of the adhesive. Various organic fillers such as fine ground shell flours, wood flour, cellulosic fibers, bark fractions, agricultural residues, and the like can also aid in viscosity control and also in the control of the penetration properties and the bonding power of the adhesive. Additionally, emulsive water repellants such as wax emulsions, resin emulsions, polyvinyl acetate emulsions, wood rosins and derivatives thereof such as Vinsol, and mixtures of such emulsions can be incorporated in a given adhesive system with various beneficial effects in water resistance, flow characteristics, tackiness, plasticity of the bond, and extent of penetration, for example. Wetting agents can also be employed, as desired. Preservatives such as borax and the chlorinated phenols are also preferably included in a manner known per se in the art.

The alkaline earth metal hydroxide forming material employed as the sole inorganic reactant in the adhesive system of the present invention functions as a gelatinization agent and is selected from the group consisting of calcium hydroxide, strontium hydroxide, barium hydroxide, calcium oxide, strontium oxide, barium oxide, and mixtures thereof. Beryllium hydroxide and radium hydroxide are not included because of toxicity and expense. Magnesium hydroxide, zinc hydroxide, cadmium hydroxide and mercuric hydroxide are not included because each is either relatively water insoluble or has insufficient effectiveness on water resistivity of the adhesive system, for purposes of the present invention. Also of course excluded from the terminology are the alkali metal hydroxides such as caustic soda, which do not materially enhance the water resistivity of the adhesive composition.

If desired, the alkaline earth metal hydroxide ingredient of our adhesive can also be formed "in situ" by the double decomposition reaction of an alkali metal hydroxide and certain alkaline earth salts which have a higher water solubility than the corresponding alkaline earth metal hydroxide. Such formation of the alkaline earth metal hydroxide reactant "in situ" is oftentimes of advantage from the point of view of pH stability because of the buffered nature of the solution.

As is well recognized, commercial grades of various alkaline earth metal hydroxide forming materials, such as contemplated by the present invention, often include more or less minute amounts of caustic or other alkal hydroxide forming materials as impurities. The usual commercial grades of alkaline earth metal hydroxide forming materials have been found satisfactory for the purposes of the present invention, and the foregoing considerations with respect to this ingredient of the instant formulations are not to be construed as preventing use of commercial grade forms of the alkaline earth metal hydroxide forming materials involved.

Certain alkali metal salts such as sodium tripolyphosphate, tetrapotassium-pyrophosphate, sodium hexametaphosphate, and the like, have a very beneficial effect on the flow and adhesive properties of the finished adhesive containing appropriate percentages of these salts.

We have found that the addition of certain chemical compounds has the beneficial effect of raising the gelatinization temperature of our adhesive mix. These compounds fall into groups which are rather specific in their action and are not related particularly one to another. Such chemical compounds are sodium chloride and other alkali metal chlorides, bromides, and iodides; calcium chloride and other alkaline earth metal chlorides, bromides and iodides, hydrogen peroxide and compounds releasing hydrogen peroxide in water solution, calcium peroxide, barium peroxide, strontium peroxide, sodium peroxide and other reactive metallic peroxides, and other per-oxygen compounds such as urea peroxide which release nascent oxygen when in contact with a water-cereal flour mixture; water soluble cupric salts such as cupric sulfate, nitrate, chloride, bromide, acetate, cupric ammonium sulfate, and the like; as well as various organic acids such as acetic, citric, lactic acid, and the like.

The halides of the alkali metals and alkaline earth metals are most effectively used by dry mixing with the flour element or dissolving in the water prior to mixing the cereal flour and water although they may be added at any stage in the mixing procedure with good effect. Where a salt is pronouncedly hygroscopic it is best to add it in the mixing water. A mixture A was prepared from 100 g. of low grade hard wheat flour with 180 g. of water (70° F.) and 3 g. of calcium hydroxide and was found to have a gelatinization temperature of 124° F. to 133° F. The addition of 2 g. of sodium chloride to this mix A produced mix B which had a gelatinization temperature of 128° F. to 134° F. The addition of 4 g. of sodium chloride to mix A gave a gelatinization temperature of 135° F. to 144° F. The addition of 8 g. of sodium chloride to mix A gave a gelatinization temperature of 132° F. to 140° F. Apparently there is not much change in gelatinization temperature beyond the addition of 4 g. of sodium chloride to mix A. The addition of 1 g. of cupric sulfate to mix A raised the gelatinization temperature of 130° F. to 138° F. The addition of 1 g. of cupric sulfate to mix B raised the gelatinization temperature up to 137° F. to 144° F. The effects of sodium chloride and cupric sulfate therefore appear additive in their ability to raise the gelatinization temperature. The addition of 2 g. of calcium chloride to mix A raised the gelatinization temperature of the resulting mix to 132° F. to 138° F. The addition of 3 g. of monocalcium phosphate to mix A raised the gelatinization temperature to 134° F. to 136° F. It is interesting to note that the addition of the monocalcium phosphate also seemed to narrow the range over which the gelatinization took place. The addition of 3 g. of citric acid to mix A raised the gelatinization temperature to 139° F. to 140° F. and simultaneously narrowed the temperature range over which gelatinization occurred. The addition of 1 g. of 30% hydrogen peroxide to mix B gave mix C which had a gelatinization temperature of 143° F. to 158° F. The addition of 1 g. of cupric sulfate to mix C elevated the gelatinization temperature further to 152° F. to 164° F. The effects of all of these various reagents capable of elevating the gelatinization temperature in general are thus seen to be additive, i.e., cumulative. Further experiments have shown that the order of addition of these materials does not materially change the cumulative effect. Generally the addition of from about 1% to about 8% of the gelatinization temperature elevating chemical compounds based upon the dry weight of the flour is effective.

In defining the resin constituent of the formulation in the present invention, the terminology "amino-aldehyde liquid resin" is to be construed as including any liquid, water soluble urea aldehyde resin and like amino-aldehyde resins, including amino-aldehyde resinous reaction products in which minor portions of other materials reactive to aldehydes, such as ammonia, monoethanolamine, ethylenediamine, diethylenetriamine, triethylenetetramine, tetraethylenepentamine, glycine, and the like may be present either in chemically reacted or unreacted form. The term "ketone-aldehyde liquid resins" is to be construed as including but not limited to acetone-formaldehyde liquid resin, methyl ethyl ketone formaldehyde liquid resin, and mixtures thereof. With respect to the definition of the various operable resins for purposes of the present invention, it is to be noted that phenol aldehyde and resorcinol aldehyde resins are generally excluded, the latter types of resins being apparently inoperable of themselves because of lack of the appropriate polyfunctional reactive linkages to form the irreversible colloid type of polyvalent metal-protein-resin complex characteristic of the invention.

While the exact chemical and physical phenomena involved have not been fully explored, it is hypothecated that the protein, the alkaline earth metal cation, and the resin on setting form a complex characterized by sharp increase in protein molecular size and an irreversible gel system, presumably because of at least partial cross-linkage condensation or like phenomena.

That the resin constituent does not form a reaction product by cross-linkage in the usual way is indicated because many of the operable resin constituents in the environ of the present invention are of the type that will not form the usual type of condensation reaction product under the alkaline conditions presented by the adhesive system here involved.

It is further theorized that the ungelatinized starch ingredient functions at least primarily as an adhesive setting promoter, i.e., to rapidly bind the water of solution by gelatinization of the starch during passage of the heated laminated product through the forming machine. In this latter respect, it has also been found that the slightly water soluble alkaline earth metal hydroxide functions substantially as effectively as a caustic soda environ, in terms of reducing the gelatinization temperature of the starch content of the adhesive solution. That an irreversible colloid is formed from the aqueous adhesive of the invention is shown by applying the aqueous adhesive formulation of the present invention to form a bond between laminated paper, then permitting the bond to cold set (by evaporation of the aqueous vehicle), after which the resulting, dried, adhesive bond is found to have a surprising degree of water resistance and bond strength properties, even though the laminate was not subjected to any heating whatsoever and even though the discrete starch constituent of the cereal flour remains entirely ungelatinized. This indicates that an interreaction of the resin element and the bursting starch is not completely essential to the development of water resistance.

From the foregoing more or less general considerations and from the following particular examples of practice of the invention, several especial and unique advantages of the invention are noteworthy. One important practical advantage is that for some gluing operations all of the ingredients except the water of dispersion can be premixed in dry form for marketing purposes. Thus, for example, the cereal flour, an alkaline earth-metal hydroxide such as hydrated lime, and the resin can be mixed and sold as a dry mix. The formulation at the point of use of the adhesive then merely involves mixing same with water. This procedure is to be contrasted with the previous requirement of preparing a heated, gelatinized starch type carrier in order to get effective dispersion of the potentially adhesive material in sufficiently fluid form. Premixes were caustic or other alkali metal oxide is the dispersing ingredients are impractical because the starch gelatinizing power of the caustic is so great as to cause local or "spot" gelatinization of the ungelatinized starch as water is added to the dry mix, which in turn is due to localized concentrations of caustic, it of course being known in the art that if the caustic concentration is sufficiently high, gelatinization of the starch occurs even at room temperature.

A second important advantage of the adhesive formulation of the present invention is that such adhesive has a remarkably fast bonding speed, permitting high production rates, which advantage is in turn traceable to the fact that substantially all of the contained starch in the adhesive is in ungelatinized form right up to the time of bond, and that the temperature necessary for its gelatinization is comparable to that obtainable in caustic containing adhesive solutions notwithstanding the absence of caustic. Yet other advantages are found in the superior water resistance of adhesive bonds in laminated paper products characteristic of the invention, and the low cost of the ingredients making up the formulation and particularly the cereal flour or the like, as compared with the isolated starches now in common use as the primary ingredient for paper adhesive systems. Advantageous also are the development of satisfactory alkalinity for fast setting, consistent with superior water resistance, and the realization of high solids content in the adhesive solution, consistent with a sufficiently low viscosity to render the adhesive solution readily handleable on product forming equipment.

One valuable function of the lime in our adhesive system, as compared with the alkali metl hydroxide of other paper adhesive compositions, is that lime does not have the undesirable effect of solubilizing the sizing used in the beater sizing of the paper used as liner or corrugating medium.

Where an adhesive is to be used on a corrugating machine it is desirable that the flow characteristic of the adhesive be such that the adhesive pumps readily from a storage tank and readily circulates through the applicator glue pans. A thixotropic viscosity or false body is not desirable in such an adhesive. Generally speaking the viscosity should be as low as possible to facilitate spreading but not so low as to be thrown off a rotating applicator roll. Glue which is thrown off the applicator is not only wasted but builds up on the mechanical equipment necessitating frequent shutdown for cleaning. Plastic flow as distinguished from viscous flow is always present to a degree where solid particles are suspended in a liquid medium. In all of the compositions of the present invention solid starch particles are present suspended in a viscous proteinaceous carrier. Such systems always show plastic flow to a degree depending on the percentage of solid particles present. The higher the concentration of particles the more pronounced is the tendency toward plastic flow. The size and shape of the particles as well as their electrical charge have an important bearing on the flow characteristic as is well known and already elucidated in standard rheology texts.

When a cereal flour is mixed with water a dough is first formed. The plastic-viscous properties of this dough are evident to anyone who has ever kneaded bread or baked a cake. Some flours are smoothly viscous and string out when flowing off a spatula, while others are "short" and tend to fall off a spatula in chunks. Flours which are smoothly viscous tend to spread better from roll applicators. A typical flour miller's description of one type of wheat flour which gives a smooth viscus dispersion is what is known as a "winter wheat, second clear." This is a term which describes the kind of grain and the particular portion of the grinding operation in a conventional roller mill flour mill where the second clear wheat flour has been "cut" or segregated from the total grind. Most flour for cooking and baking purposes is milled on multiple roller mills. The United States Food and Drug Administration has established six classes of wheat flour. They are (1) flour, (2) enriched flour, (3) self-rising flour, (4) phosphated flour, (5) bromated flour, and (6) whole wheat flour. All of these, except (6) whole wheat flour, are white flours and are often called "patent" flours. Any of these can be made from soft wheat or hard wheat. The higher gluten content of the hard wheats entraps more gas bubbles during the leavening process and makes a better rising bread. Flour from soft wheats is used chiefly for biscuits, cake, pastries, and baking flour.

Wheat is made into flour by a process called milling. The endosperm or white inner part of the kernel is separated from the bran or outer layer of the wheat kernel and from the germ by multiple grindings on roller mills and siftings.

In milling, the wheat grain is first cleaned to remove all dirt, rubbish, weed seeds, chaff, straw, etc. The clean grain is then washed, during which the bran becomes tempered or made less brittle. The grain is then passed through crushing rolls which crack the grain and loosen the bran and germ from the endosperm. The broken pieces are then separated from each other by sieving. The crushing and sieving are repeated until as much as possible of the bran and germ are separated from the flour. After the first grinding the crushed wheat is separated by sieving into "first break flour," middlings, and bran. Each succeding grinding roll is set up to grind finer and finer. After each grinding the middlings are usually separated from the bits of bran contained therein by air separation methods. The purified middlings are then ground on a finer mill to form a white flour. About 70–75# of white flour, also called "straight flour," is recovered from 100# of wheat grain. Straight flour is further graded into four grades: (1) patent, (2) first clear, (3) second clear, and (4) low grade. Patent flour is the most expensive and makes the whitest bread. The first clear and second clear grades are used for dark colored breads and when mixed with rye flour make rye breads. Second clears and low grades are frequently used for industrial purposes such as in wallpaper paste or for the extension of urea resin plywood adhesive. White or straight flour usually contains from about 5% to about 20% of protein (the protein content being taken as 6.25 times N, the nitrogen content, as determined by the Kjeldahl-Wilfarth-Gunning method). The protein in wheat flour consists of a number of individual protein materials. Two of these in wheat, "gliadin" and "glutenin," are collectively called "gluten" and constitute about 88% of the total protein in the flour. The gluten is the tough, sticky, substance which holds the carbon dioxide bubbles made by the yeast during the bread making and causes the dough to rise. The gluten can be separated from the flour by making a dough from the flour and water and kneading gently under cold running water. The starch granules are washed away until only a creamy sticky mass of gluten is left. The term "gluten" is used for rye and other flours as well as for wheat flour. White rye flour is made in a conventional roller mill process similar to the manufacture of white or straight wheat flour. The baking product known as whole wheat flour or Graham flour contains all of the bran, usually as coarse particles and is generally unsuitable for use in the adhesive of the present invention because of the poor spreading property occasioned by the coarse bran particles. A flour made by hammer milling or impact milling of the whole grain of wheat, rye, barley, and the like to give a fine ground flour containing bran, endosperm, and germ, all of which will pass through a 100 mesh screen, is quite suitable for use in our adhesive. Such a flour has a natural advantage of containing fine ground bran which acts to aid in controlling penetration of the adhesive. In order to be useful a whole ground flour must be ground to a sufficiently fine and uniform mesh size so that good spreading properties result when wet mixed. Flours having a size distribution between about 80 mesh and about 400 mesh are satisfactory, the preferred range of flour particle size being about 100 mesh to about 325 mesh. As will be readily understood by those skilled in the art, appropriate particle mesh size can be obtained by starting with a coarser cereal flour and grinding the coarser flour in wet state either with or without other ingredients of the adhesive system preliminary to use of the adhesive. In other words, the particle size ranges above indicated are related to the particle sizes of the cereal flour in the adhesive as used, regardless of whether the flour is preground to size in dry state or ground in wet state during formulation of the adhesive.

In use, the behavior of an adhesive on the corrugator is directly related to the viscosity characteristics of the adhesive resulting from elevation of its temperature. There is a pronounced difference in behavior of a typical Bauer alkaline starch adhesive made according to Bauer U.S. Patent No. 2,102,937 and a typical adhesive according to the present invention. This difference is the range of temperature over which change in viscosity takes place. In the case of the Bauer alkaline starch adhesive the change in viscosity by virtue of gelatinization of the contained discrete starch takes place over a comparatively narrow temperature range of from about two to about 5 degrees Fahrenheit, whereas in a typical calcium hydroxide dispersed wheat flour, with added water soluble resin, the gelatinization induced change in viscosity takes place over a range of from about five to about 10 degrees Fahrenheit. This extended gelatinization range is quite probably due to the combination of starch and protein present in the present adhesive.

The gelatinization temperature of an alkaline adhesive containing suspended discrete starch is governed by the pH of the environment. At a given alkaline pH, for example pH 11.0, there is an important difference in the temperature at which gelatinization begins for the typical Bauer alkaline starch adhesive as contrasted with the alkaline earth hydroxide dispersed cereal flour of the present invention. Generally speaking at a given pH level the alkaline earth hydroxide dispersed cereal flour starts gelatinizing at about 10 to 15 Fahrenheit degrees lower than the Bauer composition.

It is desirable for maximum efficiency in using our adhesives on commercially available corrugators to adjust the gelatinization temperature of the adhesive by adjusting the concentration of alkaline earth metal hydroxide and consequently the pH of the adhesive system. For highest production speeds it is desirable to operate at as low a gelatinization temperature as possible consistent with trouble free operation of the adhesive pumping and distribution system and the adhesive applicator. A modern corrugator operating at steam temperatures in the neighborhood of 375° F. provides considerable radiant and conductive heat which heats up the adhesive even though the adhesive may be continuously recirculated from its storage tank some distance from the corrugator to the reservoir pans on the corrugator in order to minimize the heat pickup. An adhesive is normally stored at a temperature above room temperature, usually about 110° F., in order to improve its fluidity and to cut down on the amount of heat transfer which is necessary to effect curing and thereby increase production speeds. This storage temperature can be artificially maintained but more often is the temperature finally attained by the bulk of the adhesive as a result of the heat absorbed in circulating through the corrugator circuit and the heat losses from the bulk storage tank to its surroundings. When an adhesive starts setting up prematurely on a modern corrugator, trouble develops initially at two places, the stripper fingers in contact with the adhesive spreader roll and the exit pipe carrying the adhesive from the reservoir pans back to the main storage tank. As an adhesive increases in viscosity due to premature setting, the thickened adhesive accumulates on the stripper fingers and the glue spread becomes erratic with poor bond in the corrugated board.

If the adhesive prematurely increases sufficiently in viscosity to interfere with the outflow of adhesive circulating between the reservoir pans on the corrugator and the main storage tank, real trouble develops which usually ends with the entire adhesive setting up in the reservoir pans and consequently a total lack of glue bond on the paper. As indicated, two important differences between out adhesive which is an aqueous dispersion of a cereal flour and an alkaline earth hydroxide, and a typical Bauer alkali metal hydroxide starch adhesive are; (1) the capability of our adhesive to be delivered to and handled on the forming equipment while at room temperatures, i.e., "cold," and (2) the range in temperature over which the viscosity increases with increase in temperature. With progressive elevation in temperature, our adhesive develops increase of viscosity more slowly and more uniformly than the Bauer adhesive and consequently is more free from circulator and spreader troubles although it still is fast setting in ultimate bond formation. While our adhesive is generally operative over the pH range of about 9.00 to about 12.5 as measured with standard glass electrode Beckman pH electrometer model 3D (making no correction for sodium ion), the preferred range for operating on a modern corrugator is between about pH 11.1 to about pH 11.5 corresponding to a gelatinization temperature of about 135° F. to about 145° F.

Various cereal flours differ in the kind and quantity of protein present. As a consequence, they differ in their ability to combine with a given alkaline earth metal hydroxide. At a given level of concentration of a given alkaline earth hydroxide the various cereal flours exhibit different pH's and consequently different gelatinization temperatures. A requisite procedure therefore in adapting a newly obtained cereal flour for use in our corrugating adhesive is to determine the curve showing the variation of pH with concentration of the alkaline earth metal hydroxide to be used and also the curve showing the variation in gelatinization temperature with concentration of the alkaline earth metal hydroxide. From these curves it is then possible to choose the proper concentration of the alkaline earth metal hydroxide at hand to give the desired gelatinization temperature for the corrugator to be used. The succeeding batches of adhesive can then be quickly checked against the pH versus concentration curve for control purposes.

As will be apparent from various of the following examples, setting forth test data concerning various formulations characteristic of the present invention, as well as other formulations not characteristic thereof, two important features of the adhesive system of the present invention are that (1) the formulation does not include any significant amount of sodium hydroxide or other alkali metal hydroxide, and (2) that no heating of the solution or pregelatinization of the starch is necessary in the preparation of the adhesive solution prior to utilization of the adhesive in paper laminating equipment.

In connection with the following examples, a number of test considerations are pertinent to quantitative evaluation of adhesives in paper laminating field. According to art recognized test procedures (TAPPI), a test consideration of water resistance can be described in terms of "fiber failure," usually given in area percentage comparison. If a sample on being soaked in water at 70° F. for 24 hours fails entirely in the fiber of the paper when two laminated pieces are pulled apart, then the adhesive bond can be described as having 100% fiber failure, i.e., as having maximum water resistance. If the failure is entirely in the adhesive bond, then the result can be described as 0% fiber failure, i.e., as having low or no water resistance. If the failure is partly in the fiber and partly in the bond, this result can be described in a percentage of fiber failure, say 30% or 50%, for example and as the case may be, depending upon the comparison of the area of fiber failure with the area of bond failure.

Another test consideration involves "bond strength" or "pull" given in percentage comparison with respect to the strength of the paper itself. An adhesive bond which is at least as strong as the wet paper is characterized as having a 100% bond strength.

A third test consideration is found in the time of set necessary to obtain an adequate dry bond approaching the strength of the paper. Time of set is an important consideration because existing laminated product forming equipment, such as that in widespread use in making corrugated paperboard, involves passage of the formed paperboard through a heater on a double-facer machine, the time of transit of unheated paper through the heater being about 5–15 seconds on the average. Obviously, an adhesive which requires 10 seconds to set can be run through a forming machine only about half as fast as an adhesive which requires but 5 seconds to set.

By gelatinization temperature is meant the Fahrenheit temperature or range in temperature Fahrenheit at which the first major viscosity increase occurs when determined by elevating the temperature of a 100 gram sample of the wet mixed adhesive contained in a 250 ml. glass beaker immersed in a hot water bath of variable temperature with constant hand stirring using a Mercury type thermometer and maintaining not more than 10° F. differential between the temperature of the water bath and the rising temperature of the wet mixed adhesive undergoing test. Practically all of the adhesive tested gelatinize over a range in temperature and in our examples this range is reported by two temperature readings in degrees Fahrenheit, the lower temperature being the temperature at which the major increase in viscosity starts and the higher temperature being that at which the adhesive attains the viscosity of a heavy paste. For example, a gelatinization temperature of 125° F. to 130° F. indicates that the major viscosity increase begins at 124° F. and continues to increase until a paste viscosity is reached at 130° F.

EXAMPLE I

An adhesive composition was prepared by mixing 50 grams of low grade hard wheat flour and containing approximately 13.5% protein, 11% moisture content, 0.5% ash, and the residue being largely starch, with 0.25 gram of sodium sulfite dissolved in 60 grams of 70° F. water until the mixture (with a pH of 7.12) was smooth and homogeneous, the sodium sulfite serving to render the wheat flour dispersible in the water solution, i.e., viscoidal.

To the cereal flour thus modified, 30 grams of water at 70° F. was added along with 5 grams of Lauxite UF–111 (a 65% solids, aqueous syrup form of urea-formaldehyde resin), the mixture then being further mixed until smooth and homogeneous.

The resulting adhesive mixture had a pH of 8.35, a viscosity of 8 when measured with a MacMichael viscosimeter operating at 22 r.p.m. and using a No. 26 wire and a bobbin immersed 3 cm. in the adhesive, this viscosity reading being equivalent to about 160 centipoises at 70° F. In such viscosity testing equipment, the bobbin consists of a brass cylinder 1 cm. in diameter and 5 cm. long with an appended disk 2⅜" in diameter and ¼" thick.

In most instances in this and the following examples, two types of test procedures were followed; (1) preparation and testing of so-called "single-face" specimens, and (2) preparation and testing of so-called "double-back" test specimens. A single-face test specimen involves a single fold or flute bonded to a flat sheet, and simulates the bond formed between the corrugated center ply and the facing liner first applied in a corrugating machine. A single-face specimen is characterized by a comparatively small area of contact in the bond area and by formation under comparatively high pressure so that comparatively more of the adhesive coating is squeezed out of the effective bond area, with the result that, of the two test procedures used, the single-face test procedure is the more stringent. A double-back test specimen involves the application under pressure of the second liner to a preformed corrugated center ply having a previously bonded first liner on the opposite side, the bond areas of the second liner to the corrugated ply of the specimen being characterized by comparatively large bond areas because of flexure of the ply flutes, and by comparatively low bonding pressures, resulting in more of the adhesive remaining in the effective bond areas. As will be noted, and as known in the art, a double-back test specimen simulates the form and characteristics of corrugated board as commonly used in commerce and as such represents a commercially effective test standard. Thus, even though improved properties attributable to a given adhesive system are less pronounced in a single-face test specimen, oftentimes a much greater degree of improvement appears in the corresponding double-back test specimen, with the latter specimen demonstrating commercially satisfactory properties.

In detail, the single-face testing procedures involved in the following examples proceeded as follows.

Corrugating medium stock 38# kraft paper) was formed around a mandrel to provide a fold or flute, the tip of the flute was then touched to a 10 mil film of adhesive, then immediately pressed against a liner (90 lb. kraft paper) on a heated platen, and pressed thereon by hand at about 10 lbs. pressure for 10 seconds, the platen being thermostatically maintained at about 375° F. Upon removal from the platen, the dry bond between the liner and the fluted corrugating medium was satisfactory to hold the two together. The specimen was aged for five days at 70° F. and 50% relative humidity before testing for water resistance. The water resistance test consisted of soaking the specimen in 70° F. water for 24 hours. At the end of the soaking time the plies of the test specimen were separated by hand and the percentage of fiber failure and approximate bond strength were noted. As indicated previously, in the event of failure entirely in the glue bond, a rating of 0% fiber failure is assigned to the specimen. In the event the failure is entirely in the paper, the rating of 100% fiber failure is given. A bond strength equivalent to the paper strength itself is rated at 100%.

The single-face adhesive bond prepared and tested according to this Example I spontaneously floated apart when tested for water resistance and was therefore rated as 0% fiber failure and 0% bond strength.

In detail, double-back test specimens were prepared in this and the following examples by taking 4" x 4" pieces of single face corrugated board and spreading adhesive on the tips of the corrugations by pressing the tips against a 10 mil film of adhesive spread on a piece of plate glass. The paper liner also 4" x 4" is immediately contacted against the adhesive coated tips and the assembly placed on a hotplate held at 375° F. for 10 seconds, the heat transferring through the applied liner just as in conventional application of the double back on a corrugator. A mild uniform pressure of about 1¼ p.s.i. was used to insure contact between the laminations of the specimen and of the specimen on the hot plate. The 4" x 4" specimens were then aged for 5 days at 70° F. and 50% relative humidity. After aging the test specimens were immersed in water at 70° F. for 24 hours and then tested while wet.

Quantitatively, it is considered that any given adhesive composition under test, in order to be commercially acceptable in terms of its wet strength properties, should exhibit at least about 50% fiber failure and at least about 50% bond strength in both single-face specimens and double-back specimens.

The double-back test specimens prepared and tested according to this Example I spontaneously floated apart just as was the case with the corresponding single-face test specimens when tested for water resistance in the same manner and were therefore also rated as 0% fiber failure and 0% bond strength.

This Example I is indicative of the fact that when no lime or equivalent ingredient is present with the modified cereal flour and when an amino aldehyde resin is employed therewith, no water resistance in the resulting adhesive bond is developed in either the single-face bond or the double-back bond. A similar test was made, substituting an acetone formaldehyde resin, "Ketac," and showed similar results.

EXAMPLE II

An adhesive composition was made by mixing 50 grams of the wheat flour of Example I rendered viscoidal by adding thereto 0.25 gram sodium sulfite dissolved in 60 grams of 70° F. water. 1.5 grams hydrated lime suspended in 30 grams of water were added to the modified wheat flour dispersion and the mixture stirred until the mixture was smooth, which occurred in about 2 minutes of stirring.

This adhesive composition had a pH of 11.6, and a viscosity of 10 on the MacMichael viscosimeter. Single-face and double-back test specimens were made as in Example I. The gelatinization temperature of the adhesive mix was found to be 130° F.–135° F. Both the single-face and double-back specimens, upon examination for water resistance and after 24 hours soaking, were found to have 0% fiber failure and 0% bond strength, indicating that the viscoidal wheat flour, with lime but without the water soluble resin constituent (UF–111), did not provide and adhesive with adequate water resistivity.

EXAMPLE III

An adhesive composition was prepared exactly as in Examples I and II except that both the 1.5 g. lime ingredient and the 5 g. urea-formaldehyde resin syrup (Lauxite UF–111) ingredient were added and the mixture stirred 2 minutes at room temperature, until smooth.

This adhesive had a pH of 11.5 (determined with glass electrode and Coleman pH electrometer, model 3D). The viscosity of the adhesive composition was 10 on the MacMichael viscosimeter (approximately 200 centipoises).

Both single-face and double-back test specimens prepared with the Example III adhesive and tested for water resistance as in Example I, showed 100% fiber failure and 100% bond strength. The necessary minimum pressing time to obtain a dry bond at 375° F. heating plate was determined to be between 3 and 4 seconds. The adhesive composition had a gelatinization temperature of 128° F. to 134° F. This test as to gelatinization temperature was made as previously described.

From such test results as well as related investigations the following advantageous attributes are found to be attributable to our lime-protein-starch-resin adhesive system as compared with a caustic-starch system, even in the absence of a resin ingredient; (a) a substantial increase in range of gelatinization temperature, (b) a lower average gelatinization temperature to that obtained by caustic to give the same pH in a caustic-starch system, (c) realization of a viscoidal dispersion simply by cold mix techniques, (d) a markedly enhanced water resistance characteristic when dried by evaporation, i.e., when cold-set, (e) the capability of being handled commercially as a dry mix, with the "spot" gelatinization problem inherent in caustic obtaining dry mixes being obviated, and (f) commercially acceptable water resistince and production rates with the lime-protein adhesive of the present invention by addition of water-resistance imparting ingredients such as UF liquid resin, whereas the corresponding caustic-starch system does not give comparable water resistance regardless of setting time, and does not give adequate water resistance under acceptable production speeds.

EXAMPLE IV

A series of tests was conducted to investigate the effect of employment of various polyvalent alkaline metal hydroxide forming materials as the inorganic reactant in the lime-protein-starch-resin adhesive system of Example III, with the following results.

An adhesive composition was prepared and tested exactly as in Example III, except 6.3 grams of barium hydroxide, $Ba(OH)_2 \cdot 8H_2O$, was substituted for the lime ingredient. The pH of the mix was 1.4. The MacMichael viscosity was 10. The water resistance tests showed 100% fiber failure and 100% bond strength in both the single-face and double-back specimens. The dry bond was observed to begin when the pressing time reached 3 seconds and was 100% complete when the pressing time reached 5 seconds. This test demonstrates the effectiveness of $Ba(OH)_2$ in adhesive systems according to the present invention.

To test the effectiveness of $Sr(OH)_2 \cdot 8H_2O$ as the inorganic reactant, an adhesive composition was made by cold mixing 100 grams of White Spear brand pastry flour containing 7% protein, 0.41% ash, and 13% moisture content), 0.5 gram sodium sulfite, and mixing with 150 grams of 70° F. water until smooth. To this was added 10 grams of Lauxite UF–111 containing 65% urea-formaldehyde resins solids, with the mixture being stirred until smooth. 20 grams of strontium hydroxide hydrate (i.e., $Sr(OH)_2 \cdot 8H_2O$) contained in 40 grams of 70° F. water were added and mixed until smooth. The pH of the mixture was 11.95. The viscosity of 70° F. was 11 on the #26 wire MacMichael (equivalent to about 220 centipoises) and the gelatinization temperature was 101° F. to 105° F. Test specimens were prepared exactly as in Example I and when tested for moisture resistance on 24 hour soak showed 90% fiber failure and 100% bond strength in the single-face instance and 80% fiber failure and 80% bond strength in the double-back instance. This test establishes that $Sr(OH)_2 \cdot 8H_2O$ is also operable as the inorganic reactant in adhesive systems of the present invention.

To test the effectiveness of $Mg(OH)_2$ as the inorganic reactant in an adhesive mix otherwise like that tested in Example III, an adhesive composition was prepared exactly as in Example III, except 0.8 gram of magnesium oxide was substituted for the lime ingredient. The pH of the adhesive composition was 10.32 and the MacMichael viscosity was 10. This adhesive composition, although somewhat more tacky than the lime containing composition of Example III, was somewhat slower in time of set, and exhibited a minimum pressing time requirement of 6.7 seconds to form a dry bond. The water resistance of the single-face specimens when tested as before was 0% fiber failure and 0% bond strength, and the double-back specimens showed 50% fiber failure and 50% bond strength. In view of the absence of substantial water resistivity in the single-face specimens, this test indicates that $Mg(OH)_2$ is not a practical substitute for the lime ingredient in adhesive compositions according to the present invention.

To test the effectiveness of $Zn(OH)_2$ as a substitute for the lime ingredient in the adhesive mix of Example III, an adhesive composition was prepared as in Example III, except that 1.6 grams of zinc oxide was substituted for the lime. The pH of the adhesive composition was 8.25 and the MacMichael viscosity was 11. Single-face specimens showed 0% fiber failure and 0% bond strength, and double-back test specimens showed 0% fiber failure and 20% bond strength. The minimum pressing time required for setting of the bond using this adhesive composition was about 7–8 seconds. In view of the low wet strength in both the single-face and double-back test specimens, this test indicates that zinc hydroxide is not a suitable equivalent for the lime ingredient in adhesive mixes according to the present invention.

EXAMPLE V

The series of tests was conducted to investigate the effectiveness of various water soluble resins in the lime-protein-starch-resin adhesive system of the present invention.

In the first of these tests, an adhesive composition was prepared exactly as in Example III except that the proprietary product Amrez 225 (a 65% solids, urea-formaldehyde resin syrup) was used as the resin constituent. The pH of the resulting adhesive composition was 11.46 and the viscosity was 9 MacMichael. The water resistance tests of specimens utilizing this adhesive composition showed 80% fiber failure and 90% bond strength for the single-face specimens and 100% fiber failure and 100% bond strength for the double-back specimens.

To test the effect of use of a ketone-aldehyde resin, an adhesive composition was prepared as in Example III, except that Bakelite ketone-aldehyde resin XRL–0648 was substituted for the Lauxite UF–111 resin ingredient. The pH of the resulting adhesive composition was 11.20 and the viscosity was 8 MacMichael. The specimens prepared with this adhesive composition demonstrated 100% fiber failure and 100% bond strength in both single-face and double-back specimens. Minimum pressing time required for dry set of the bond was between 4 and 5 seconds. This test indicates that the resin ingredient of adhesive mixes according to the present invention can include ketone-aldehyde resins as well as the urea-formaldehyde type resins shown to be effective by the immediately preceding test and the test results in Example III.

To test the effectiveness of another amino-aldehyde type resin as the resin ingredient in the adhesive mix of the present invention, and the use of calcium bisulfite as a viscosity controlling agent, a solution of calcium bisulfite was prepared by suspending 0.8 gram of calcium hydroxide in 20 grams of 70° F. water and bubbling gaseous sulfur dioxide from a cylinder into the suspension until the calcium hydroxide was completely reacted and dissolved. An adhesive was prepared by mixing 100 grams of low grade hard wheat flour, 20 cc. of the prepared calcium bisulfite solution, and 260 grams of 70° F. water. 6 grams of hydrated lime suspended in 20 grams of water were added to the previous mix and thoroughly mixed. 20 grams of Uformite 700 (a 30% amino-aldehyde resin) were stirred into the mix after the lime had reacted. This gave an exceptionally smooth adhesive which had a pH of 11.42, a viscosity of 140 centipoises, and a gelatinization temperature of 128° F. to 133° F.

Test specimens were prepared exactly as in Example I and after aging 5 days at 70° F. and 50% relative humidity and soaking 24 hours in water at 70° F., the single-face test specimens showed 80% fiber failure and 90% bond strength, while the double-back test specimens showed 70% fiber failure and 80% bond strength.

The last test also demonstrates the beneficial effect of using calcium bisulfite as the chemical agent for controlling viscosity.

To investigate the use of a phenol-formaldehyde resin as the resin in a lime-protein-starch-resin adhesive mix according to the invention, an adhesive composition was made by mixing 100 grams of low grade hard wheat flour, 1.0 gram of sodium sulfite, and 200 grams 70° F. water until smooth (about 5 minutes). To this was added 3 grams of hydrated lime suspended in 10 grams of water and the mixture stirred until smooth. To this was then added 10 grams of Lauxite PF-520 resin consisting of a 40% solids, aqueous alkaline phenol-formaldehyde resin. On the addition of the resin the mixture thickened appreciably. The pH of the adhesive was 11.52 and the viscosity was 160 cps. at 70° F.

Test specimens were made as in Example I. After aging 5 days and soaking for 24 hours the single-face specimens showed 0% fiber failure and 0% bond strength, and the doubleback specimens showed 0% fiber failure and 20% bond strength.

This experiment demonstrates the almost total lack of water resistance when a phenol formaldehyde resin replaces the amino-aldehyde or ketone-aldehyde resin of our compositions.

To investigate the use of a resorcinol-formaldehyde resin as the resin ingredient in adhesive compositions according to the invention, an adhesive composition was made by mixing 100 grams of low grade hard wheat flour, 1 gram of sodium sulfite, with 140 grams of 70° F. water until smooth. To this was added with thorough mixing 3 grams of hydrated lime. To this was then added 10 grams of Plyophen 6000 and 1.5 grams of Plyophen catalyst F-1684 (Plyophen 6000 is a resorcinol-formaldehyde resin and F-1684 catalyst consists of paraformaldehyde and filler). The adhesive curdled on the addition of the resin and gave a short nontacky adhesive having a pH of 11.31 and a viscosity of 160 centipoises at 70° F.

Test specimens were prepared as in Example I and after aging for 5 days and soaking 24 hours in water, the single-face specimens showed 0% fiber failure and 20% bond strength and double-back specimens showed 20% fiber failure and 30% bond strength, indicating that resorcinol-formaldehyde type resin is not an equivalent of urea-formaldehyde resins of ketone-aldehyde resins for purposes of the present invention.

EXAMPLE VI

Tests were also conducted to determine the relative effectiveness of resin compositions in adhesive mixes according to the present invention, when the resin ingredient is employed in dry powder form, rather than as a liquid (i.e., syrup). In the first of such tests, a dry adhesive composition was prepared by dry mixing 100 grams of low grade hard wheat flour, 3 grams hydrated lime, 1 gram sodium sulfite, 6 grams Urac 110 (a dry powder neat urea-formaldehyde resin). This dry mixture was stable and stored satisfactorily in kraft paper bags. The above dry composition was mixed with 180 grams of water to give an adhesive having good tack and having a pH of 11.40 and a viscosity of 120 centipoises at 70° F. Test specimens were made as in Example I and after conditioning for 5 days at 70° F. and soaking 24 hours showed 0% fiber failure and 10% bond strength in the single-face instance, and 30% fiber failure and 60% bond strength in the double-back instance. This test indicates that while some water resistivity is developed when the urea-formaldehyde resin is in dry powder form rather than liquid form, the dry powder form is not nearly as effective as the liquid form and is not of adequate effectiveness for purposes of the present invention, in terms of meeting the water resistivity standard of at least 50% fiber failure and at least 50% bond strength in both single face and double back applications.

The second test utilizing a resin ingredient in dry powder form involved preparation of a dry adhesive composition, compounded by dry mixing 100 grams of low grade hard wheat flour, 3 grams hydrated lime, 1 gram sodium sulfite and 6 grams of Melurac 301 (consisting of a dry powder copolymer resin of 30% melamine-70% urea with formaldehyde). The above dry composition was mixed with 180 grams of 70° F. water and gave a smooth adhesive having a pH 11.38 and a viscosity of 100 cps. at 70° F. Test specimens were made as in Example I and after 5 days aging and soaking 24 hours in water showed 0% fiber failure and 10% bond strength in the single-face instance, and 30% fiber failure and 40% bond strength in the double-back instance. This test confirms the first test of this example with regard to the determination that the resin ingredient should be in liquid form rather than in dry powder form for purposes of the present invention.

EXAMPLE VII

Several tests, presented in this example, were conducted to determine the effect of the variation of concentration of the lime ingredient in adhesive compositions characteristic of the present invention.

A series of adhesives were prepared by mixing 75 grams of low grade hard wheat flour, 0.5 gram sodium sulfite to render the flour viscoidal, 1.5 grams of hydrated lime with 140 grams of 70° F. water and varying the quantities of Lauxite UF-111 (65% aqueous urea resin syrup) as shown in the following table. The pH, viscosity, and double-back adhesion results are also tabulated.

| Amount of UF-111 (grams) | Viscosity in cps. | pH | Double back 24 hours soak test | |
|---|---|---|---|---|
| | | | Fiber failure, percent | Bond strength, percent |
| 2 | 100 | 11.60 | 20 | 50 |
| 4 | 120 | 11.60 | 50 | 70 |
| 6 | 120 | 11.59 | 80 | 90 |
| 8 | 140 | 11.59 | 100 | 100 |
| 10 | 120 | 11.57 | 100 | 100 |
| 12 | 140 | 11.56 | 100 | 100 |
| 90 | 100 | 11.30 | 100 | 100 |

These results show that although a substantial degree of water resistance resulted from as little as 2 grams of resin per 75 grams of cereal flour, a commercially adequate water resistivity is not realized until about 4 grams of resin is used with 75 grams of the flour (i.e., the resin ingredient amounts to at least about 5% by weight in proportion to the cereal flour ingredient). In the course of this series of tests it was also noted that the gelatinization temperature remained substantially the same for all of the adhesive compositions being substantially independent of the urea resin concentration, and was from about 126° F. to about 136° F.

EXAMPLE VIII

A series of tests, presented in this example, was conducted to determine the effect of varying the concentration of the lime reactant in adhesive compositions according to the invention. Test compositions were prepared by mixing 75 grams of low grade hard wheat flour with 0.5 g. sodium sulfite, 130 grams water, and 5 grams Lauxite UF–111, and by varying the quantity of hydrated lime added, with results as shown in the following table:

| $Ca(OH)_2$ (g.) | pH | Visc. (cps. at 70° F.) | Gel temp. (° F.) | Fiber[1] failure, percent | Bond[1] strength, percent |
| --- | --- | --- | --- | --- | --- |
| 0.5 | 10.92 | 140 | 137–142 | 0 | 40 |
| 1.0 | 11.35 | 60 | 126–138 | 30 | 40 |
| 1.5 | 11.59 | 80 | 126–136 | 60 | 60 |
| 2.0 | 11.58 | 120 | 122–132 | 70 | 80 |
| 3.0 | 11.75 | 140 | 115–124 | 80 | 90 |

[1] Double back specimens, 24 hour soak test.

These data show that the lime content should be at least about 2% by weight in proportion to the weight of the cured flour in the mix if adequate water resistivity is to be realized. The lime ingredient is of course a relatively cheap ingredient so use thereof in substantial quantities is commercially quite feasible, limited only by the tolerable minimum gelatinization temperature. Thus where a corrugating application is contemplated, lime concentrations up to about 5% of the weight of the flour can be used, depending upon the tolerable gelatinization temperature. Above about 5%, the additional lime serves primarily as an inert filler, so in applications where a low gelatinization temperature is not objectionable use of 100% or more of lime by weight, in proportion to the flour weight, may be used if desired.

EXAMPLE IX

To further illustrate an adhesive mix typical of the present invention, employing another type of cereal flour, a barley flour was prepared by grinding the whole barley grain on a "Unifine" mill impact pulverizer and using the fraction passing through a 150 mesh screen which was 75% of the original feed weight. This flour contained 12% protein, 0.8% ash and 12.5% moisture. An adhesive was prepared by taking 100 grams of the milled barley flour and treating it with 1 gram of sodium bisulfite to render it viscoidal. 1 gram pine oil was also added to reduce foaming. The mixture was then mixed with 200 grams of 70° F. water until smooth. To this aqueous mixture was added 10 grams of Lauxite UF–115, a urea-formaldehyde resin solution containing 65% solids, and the mixture stirred 4 minutes. 3 grams of hydrated lime suspended in 20 grams of 70° F. water was then mixed with the previous mix. This adhesive had a pH of 11.30, a viscosity of 200 centipoises, and a gelatinization temperature of 126° F. to 132° F.

Test specimens were made and tested as in Example I and after aging for 5 days, then being soaked for 24 hours in water at 70° F., showed 50% fiber failure and 60% bond strength in the single-face instance, and 90% fiber failure and 90% bond strength in the double-back instance.

With the above examples and considerations in view, the following generalized considerations can be made with respect to paper laminating adhesive characteristic of the present invention. With respect to these considerations, it must be kept in mind that commercial production requirements as to economics, adequate water resistance of the adhesive bond in a particular product, and overall simplicity and reliability under production conditions can permit considerable variation as to ingredients and formulation concentrations. Generally, however, the foregoing examples and related test work indicate the following conclusions. The viscoidal, proteinaceous, starch containing primary material such as a cereal flour or the like can be as earlier defined, with or without appropriate addition of various additives to realize suitable viscosity and spreadability in a given application. In general such primary material should have an adequate protein content to serve effectively as a carrier for the discrete starch and to satisfy the reaction requirement of the system in formation of a water resistant complex, and further has an adequate discrete starch content to give a satisfactory curing speed and also an acceptable bond strength. The alkaline earth metal hydroxide reactant serving as an ingredient of the system can be as earlier defined, keeping in mind that appropriate selection of a given reactant is determined by such factors as cost, degree of water solubility and consequent desired degree of alkalinity and acceptable water resistance level sought in the adhesive bond. The resin constituent when used can be as earlier defined, also keeping in mind that the specific resin and concentration in a given adhesive system is affected by considerations of competitive cost and degree of water resistance sought. One of the advantages of the instant adhesive system is that such is capable of satisfactory water resistant properties and production speeds even at low order solids concentrations, with operable solids concentrations ranging generally from about 10% to about 50% based on the dry weight of the solids in the composition, and with suitable solids concentrations for corrugating applications being about 15% to about 35%, the ranges of concentrations in these regards being determined only by considerations of desired production speed and desired spreadability.

In terms of the concentration of the protein and starch constituencies in a wet mix characterizing our adhesive system, the protein content generally should be at least about 0.3% and preferably at least about 0.45% for corrugating purposes, when the starch content generally should be from about 5% to about 35%, and preferably from about 12% to about 30%, such concentrations being by weight, based on the total weight of the wet mix. The instant adhesive system is characterized by substantial alkalinity, obtained by addition of an alkaline earth metal hydroxide reactant as distinguished from caustic or the like, with operable hydrogen ion concentrations ranging from about 9.0 to about 12.5 with the preferred pH range being from about 10.5 to about 12.0. The range range of viscosity of the aqueous adhesive composition can range generally from about 5 centipoises to about 10,000 centipoises and for corrugating purposes from about 25 to about 400 centipoises and preferably from about 100 to about 220 centipoises, again depending upon acceptable solids concentrations and production speed at the lower viscosities and upon acceptable spreadability at the higher viscosities. Also, the present adhesive system is capable of commercially acceptable gelatinization temperatures and has a characteristic relatively wide spread or range in this regard, such temperature spread being 5° F. to 10° F. in many instances and such gelatinization temperatures ranging as low as about 110° F. to even as high as about 160° F., with a range of from about 120° F. to about 150° F. being preferred for corrugating applications, the selection of a suitable gelatinization temperature range being determined by reasonable stability prior to and during use on one hand and by commercially adequate production speeds on the other hand. With the preferred gelatinization temperature range indicated, it has been determined that quite stable production conditions and excellent product quality can be maintained with the drying temperature at least about 350° F. and optimally about 375° F., and with the operating speed of the equipment at least about 300 feet per minute and optimally about 400 feet per minute.

From the foregoing, various further formulations, variations, modifications and adaptions of adhesive systems characterizing the present invention will readily occur to those skilled in the art.

What is claim:

1. A dry, potentially adhesive composition adapted when in the form of an aqueous dispersion for use as a bonding agent for laminating paper and the like upon being subjected to heat in situ, said composition comprising:
   (a) as a first reactant; a finely divided, potentially adhesive, potentially viscoidal primary material having a protein content of at least about 3% by weight and an ungelatinized starch content of from about 50% to about 85% by weight, with said protein serving as a carrier for said ungelatinized starch when said material is in aqueous dispersion;
   (b) as a second reactant and starch gelatinization agent, a nonviscoidal, slightly water soluble, alkaline earth metal hydroxide forming material selected from the group consisting of calcium oxide, barium oxide, strontium oxide, calcium hydroxide, barium hydroxide, strontium hydroxide, and mixtures thereof, said alkaline earth metal hydroxide forming material being essentially the only inorganic reactant in said composition, and providing by chemical reaction with the protein a substantial water resistance in the adhesive bond which results on drying of an aqueous dispersion of the composition; and
   (c) as a third reactant, a liquid, water soluble resin selected from the group consisting of amino-aldehyde liquid resins, ketone-aldehyde liquid resins, and mixtures thereof.

2. A composition according to claim 1, wherein said second reactant consists essentially of lime.

3. A composition according to claim 1, wherein said third reactant consists essentially of urea-formaldehyde resin.

4. A composition according to claim 1, wherein said second reactant is present in the amount of at least about 2% by weight in proportion to the weight of the first reactant, and said third reactant is present in the amount of at least about 5% by weight in proportion to said first reactant.

5. A composition according to claim 1, wherein said cereal type flour is selected from the group consisting of wheat flour, rye flour, oat flour, barley flour, millet flour, corn flour, sorghum flour, milo flour, pea flour, potato flour, and mixtures thereof.

6. A composition according to claim 5, wherein said cereal type flour is essentially of a particle size less than about 100 mesh.

7. A composition according to claim 5, wherein said cereal type flour is at least principally wheat flour.

8. A composition according to claim 1, wherein said first reactant is at least principally wheat flour, said second reactant is at least principally lime present in the amount of about 2% by weight in proportion to said first reactant, and said third reactant is at least principally urea-formaldehyde resin present in the amount of at least about 5% by weight in proportion to said first reactant.

9. A composition according to claim 1, further comprising at least one additive ingredient selected from the group consisting of viscosity modifying agents, inorganic and organic filler materials, emulsive water repellants, wetting agents, and preservatives.

10. A wet mix, potentially adhesive composition for use as a bonding agent for laminating paper and the like upon being subjected to heat in situ, said composition comprising:
   (a) water, present in the amount of from about 50% to about 90% by weight of the wet mix;
   (b) as a first reactant; a finely divided, potentially adhesive, viscoidal, primary material having a protein content of at least about 0.3% by weight of the wet mix and further having an ungelatinized starch content of from about 5% to about 35% by weight of the wet mix, said protein constituent serving as a carrier for said ungelatinized starch constituent;
   (c) as a second reactant and starch gelatinization agent; a nonviscoidal, slightly water soluble alkaline earth metal hydroxide selected from the group consisting of calcium hydroxide, barium hydroxide, strontium hydroxide, and mixtures thereof, said alkaline earth metal hydroxide being essentially the only inorganic reactant in said composition, and providing by chemical reaction with the protein a substantial water resistance in the adhesive bond which results on drying of an aqueous dispersion of the composition; and
   (d) as a third reactant, a liquid, water soluble resin selected from the group consisting of amino-aldehyde liquid resins, ketone-aldehyde liquid resins, and mixtures thereof.

11. A composition according to claim 10, wherein said second reactant consists essentially of calcium hydroxide.

12. A composition according to claim 10, wherein said third reactant consists essentially of urea-formaldehyde resin.

13. A composition according to claim 10, wherein said second reactant is present in the amount of at least about 2% by weight in proportion to the weight of the first reactant, and said third reactant is present in the amount of at least about 5% by weight in proportion to said first reactant.

14. A composition according to claim 10, wherein said cereal type flour is selected from the group consisting of wheat flour, rye flour, oat flour, barley flour, millet flour, corn flour, sorghum flour, milo flour, pea flour, potato flour, and mixtures thereof.

15. A composition according to claim 14, wherein said cereal type flour is essentially of a particle size less than about 100 mesh.

16. A composition according to claim 14, wherein said cereal type flour is at least principally wheat flour.

17. A composition according to claim 10, wherein said first reactant is at least principally wheat flour, said second reactant is at least principally lime present in the amount of about 2% by weight in proportion to said first reactant, and said third reactant is at least principally urea-formaldehyde resin present in the amount of at least about 5% by weight in proportion to said first reactant.

18. A composition according to claim 10, further comprising at least one additive ingredient selected from the group consisting of viscosity modifying agents, inorganic and organic filler materials, emulsive water repellants, wetting agents, and preservatives.

19. A composition according to claim 10, adapted for bonding of corrugated board stock under commercial production conditions, wherein said composition has a pH of from about 10.5 to about 12, a viscosity of from about 25 to about 400 centipoises, a solids concentration of from about 15% to about 35% based on the dry weight of the solids in the composition and a gelatinization temperature range of from about 120° F. to about 150° F.

References Cited

UNITED STATES PATENTS

| | | | |
|---|---|---|---|
| 2,492,510 | 12/1949 | Van Epps | 260—6 |
| 2,872,421 | 3/1959 | Shelton et al. | 260—6 |
| 2,874,134 | 3/1959 | Gossett et al. | 260—6 |
| 3,336,246 | 8/1967 | Golick et al. | 260—6 |

WILLIAM H. SHORT, *Primary Examiner.*

E. M. WOODBERRY, *Assistant Examiner.*

U.S. Cl. X.R.

156—328; 161—261, 263; 260—17.3